Figure 1:
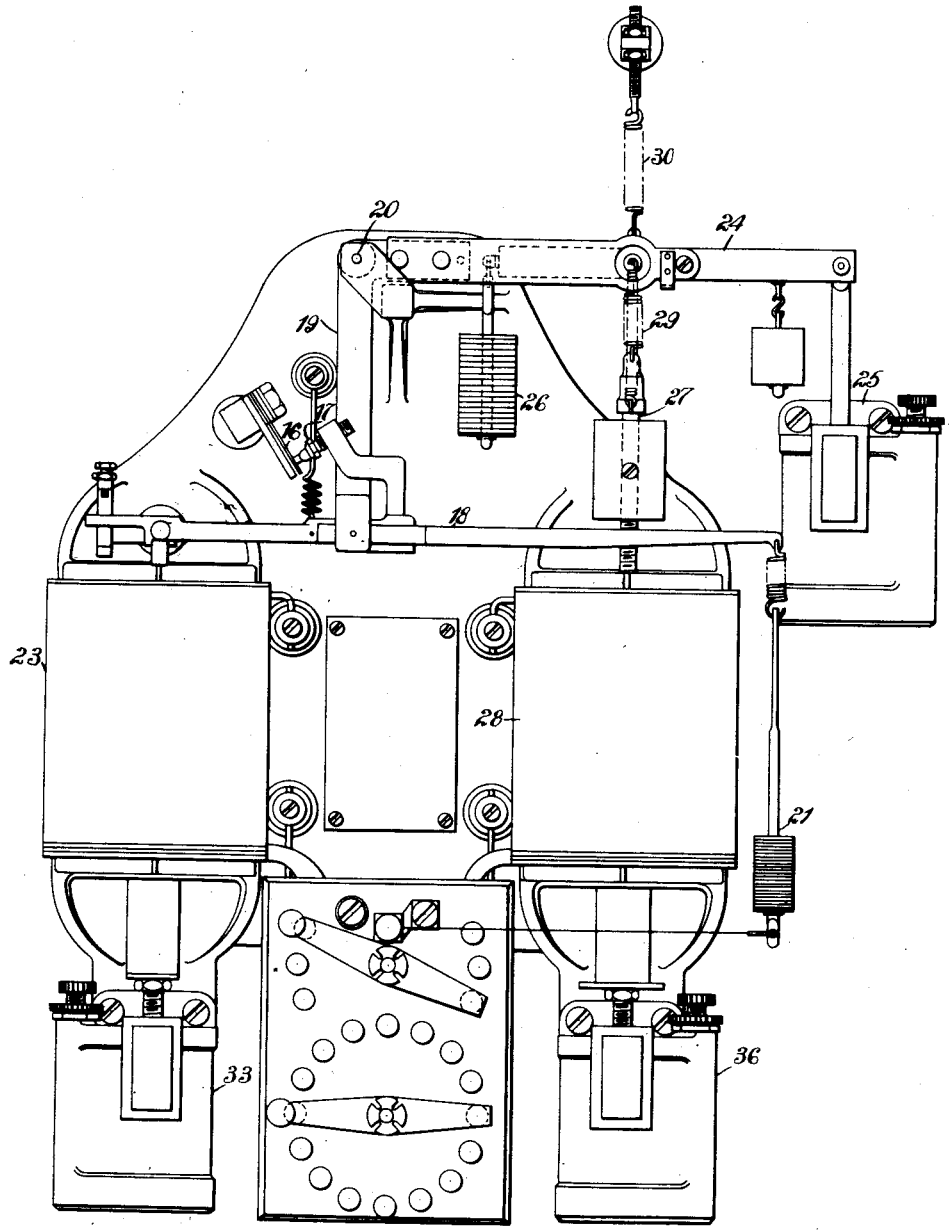

C. A. BODDIE.
REGULATOR SYSTEM AND APPARATUS.
APPLICATION FILED AUG. 10, 1918.

1,435,203.

Patented Nov. 14, 1922.
3 SHEETS—SHEET 1.

WITNESSES:
J. T. Wurml.
W. B. Wells.

INVENTOR
Clarence A. Boddie.
BY
Wesley Sloan
ATTORNEY

C. A. BODDIE.
REGULATOR SYSTEM AND APPARATUS.
APPLICATION FILED AUG. 10, 1918.
1,435,203.
Patented Nov. 14, 1922.
3 SHEETS—SHEET 2.
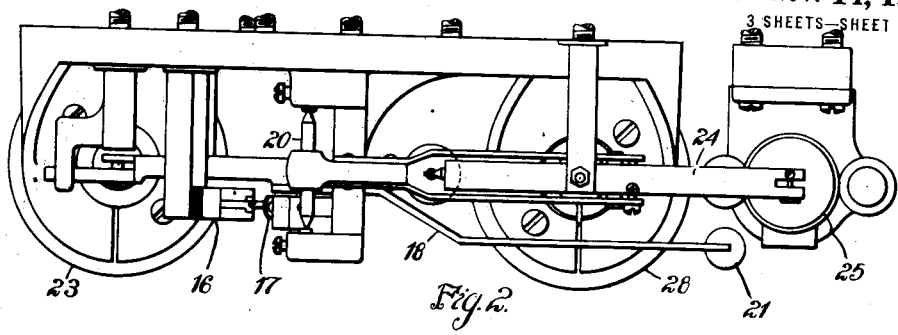
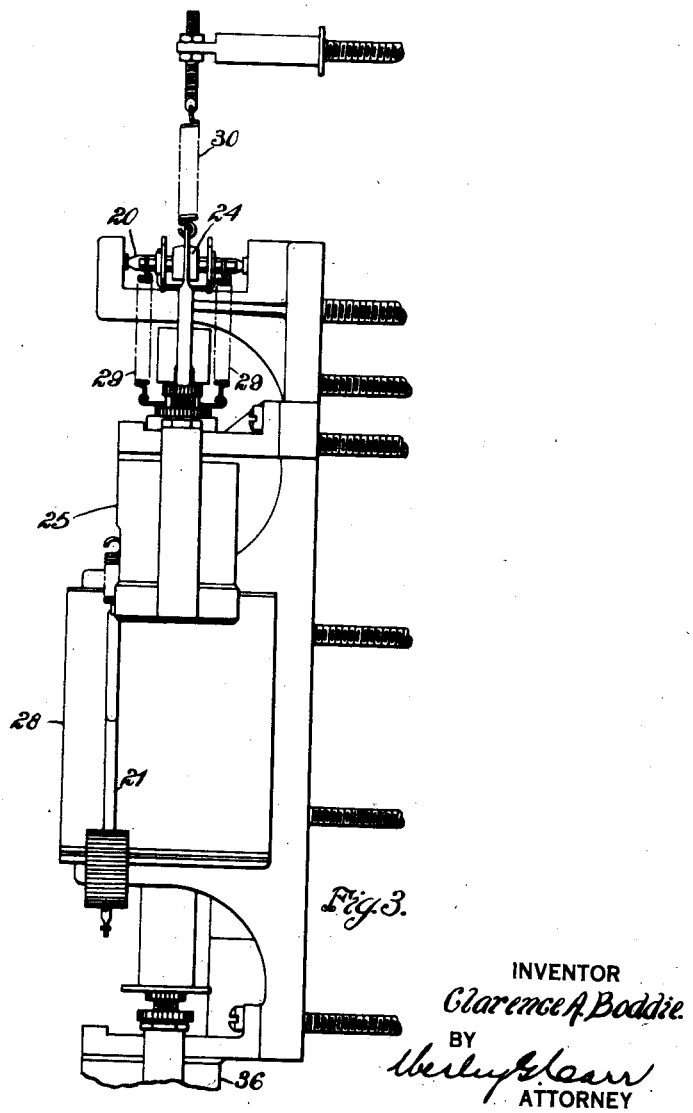
WITNESSES:
INVENTOR
Clarence A. Boddie.
BY
ATTORNEY Patented Nov. 14, 1922.

1,435,203

UNITED STATES PATENT OFFICE.

CLARENCE A. BODDIE, OF PITTSBURGH, PENNSYLVANIA, ASSIGNOR TO WESTINGHOUSE ELECTRIC & MANUFACTURING COMPANY, A CORPORATION OF PENNSYLVANIA.

REGULATOR SYSTEM AND APPARATUS.

Application filed August 10, 1918. Serial No. 249,324.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Regulator Systems and Apparatus, of which the following is a specification.

My invention relates to regulator systems and to apparatus therefor and particularly to regulator systems for maintaining a substantially constant voltage in supply circuits.

One object of my invention is to provide a regulator for a supply circuit that shall maintain a substantially constant voltage in the supply circuit without effecting an undue permanent change in the current conditions of the system.

Another object of my invention is to provide a regulator for an alternating-current supply circuit that shall be quickly responsive to voltage changes and relatively slowly responsive to current changes in the supply circuit for effecting a substantially constant voltage in the supply circuit.

More specifically, my invention embodies a regulator for an alternating-current supply circuit which is provided with a synchronous condenser, that is quickly responsive to voltage changes and is slowly responsive to current changes in the condenser circuit in order to control the excitation of the synchronous condenser and maintain substantially normal-voltage conditions in the supply circuit.

It is necessary, in many cases, to provide alternating-current supply circuits, which have feeder circuits connected to them and which are connected to sources of power, with synchronous condensers which serve not only to govern the power factor of the supply circuits but also to govern the voltage of the supply circuits within certain limits. However, in case the capacity of the supply circuit is relatively small, as compared with the capacity of the source of power and such circuit is connected to the source of power by a connection having comparatively small inductance, it is difficult to effect voltage control of the supply circuit without producing abnormal current conditions in the supply circuit and consequent overloading of the synchronous condenser.

In a system of the above-indicated character which is constructed in accordance with my invention, means is provided for quickly varying the excitation of the condenser in accordance with the voltage changes in the supply circuit, and further means is provided for slowly varying the excitation of the condenser in accordance with current conditions in the condenser circuit. Thus, the synchronous condenser is very sensitive to voltage changes in the supply circuit and quickly counteracts any such changes. In making voltage corrections, by means of a synchronous condenser, it is impossible to prevent abnormal current conditions from obtaining in the supply circuit, as above set forth. However, a correction of the abnormal current conditions in the supply circuit is made in a relatively slow manner in order to permit the voltage regulators, which are connected to the various feeder circuits, to make complete corrections for the voltage changes in the supply circuit.

In the accompanying drawings, Fig. 1 is a front elevational view of a regulator constructed in accordance with my invention; Figs. 2 and 3 are respectively, top plan and side elevational views of the regulator shown in Fig. 1; and Fig. 4 is a diagrammatic view of a regulator system embodying my invention.

Figure 4:
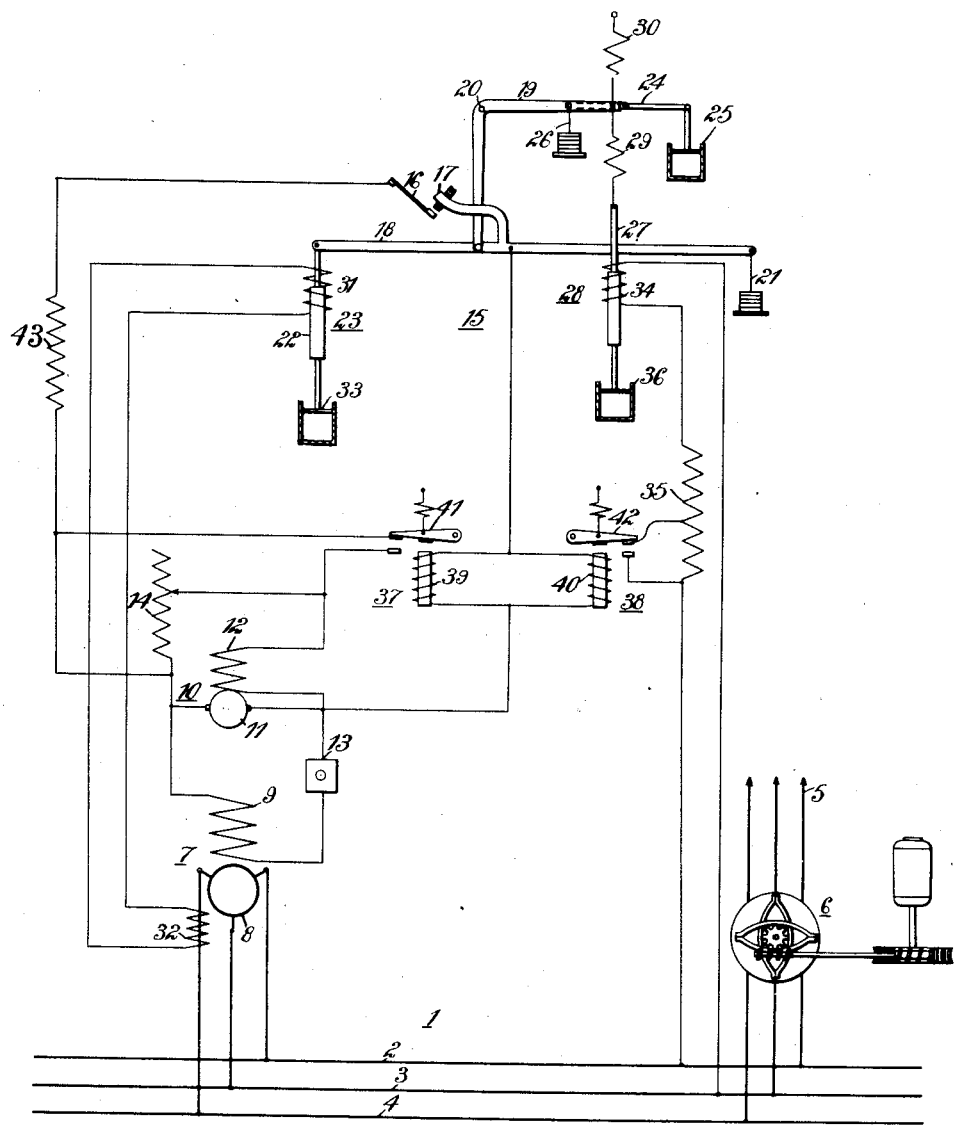

Referring to the accompanying drawings, and particularly to Fig. 4, an alternating-current supply circuit 1, comprising conductors 2, 3 and 4, is connected to a source of power (not shown) and has a number of feeder circuits connected to it, one only of which, 5, is illustrated in the drawing. Each of the feeder circuits is provided with a suitable regulator 6, preferably of the induction type, for correcting the voltage changes.

A synchronous condenser 7, which embodies an armature 8 and a field winding 9, is connected to the supply circuit 1 and serves not only to regulate the power factor of the supply circuit but also to regulate the voltage therein, within certain limits. An exciting generator 10, having an armature 11 and a field winding 12, is provided for governing the excitation of the field winding 9, the field winding 9 being connected to the armature 11 through a rheostat 13. The field winding 12 of the exciting generator 10 is connected across the armature 11 through an adjustable resistor 14 that is adapted to be short-circuited, for a purpose to be hereinafter set forth.

A regulator 15, which serves to govern the excitation of the synchronous condenser in accordance with the voltage and the current conditions in the supply circuit, embodies a resiliently mounted contact member 16 and a cooperating contact member 17 which is mounted upon a lever 18. The lever 18 is pivotally mounted upon a bell-crank lever 19 which is pivotally mounted at a point 20. A counterweight 21 is connected to the lever 18, near one end thereof, and the core armature 22 of an electromagnet 23 is pivotally connected to the lever 18, near the opposite end thereof. A second lever 24, which has a dash-pot 25 and a counterweight 26 connected to it near its respective ends, is pivotally mounted upon the bell-crank lever 19 between the pivotal connections of the counterweight 26 and the dashpot 25. The core armature 27 of an electromagnet 28 is resiliently connected, by means of a spring 29, to the lever 24 between the pivotal connection of the lever 24 to the lever 19 and the connection of the counterweight 26 to the lever 24. A spring 30 is located on the side of the lever 24 that is opposite to the electromagnet 28 for opposing the action of the latter.

The electromagnet 23 is provided with a winding 31 which is connected to a current transformer 32. The transformer 32 is included in the circuit of the synchronous condenser 7 for energizing the electromagnet 23 in accordance with the current conditions which obtain in the supply circuit. The core member 22 of the electromagnet 23 is provided with a dash-pot 33 which is heavily damped in order to render the electromagnet 23 very sluggish in its operation.

The electromagnet 28 is provided with an energizing winding 34 which is connected, through a resistor 35, to the supply conductors 2 and 3 for operating the electromagnet 28 in accordance with the voltage conditions which obtain in the supply circuit. The core member 27 of the electromagnet 28 is provided with a dash-pot 36 which is very lightly damped, as compared with the dashpot 33 associated with the electromagnet 23. Thus, the electromagnet 28 is adapted to respond very quickly to voltage changes in the supply circuit, whereas the electromagnet 23 is adapted to respond comparatively slowly to any current changes that may obtain in the condenser circuit.

The dash-pot 25, which is connected to the lever 24, is damped in a manner to serve as a fulcrum for the lever 24 when it is subjected to rapid vibrations by means of the electromagnet 28 to effect movement of the levers 19 and 18 for operating the contact members 16 and 17. However, in case of a sustained movement of the lever 24 by means of the electromagnet 28, the dash-pot 25 is operated in a manner to prevent further movement of the levers 19 and 18 for operating the contact members 16 and 17.

The contact members 16 and 17 are adapted to control the operation of two relays 37 and 38 which respectively comprise windings 39 and 40 and contact members 41 and 42. The contact members 16 and 17, when in engagement with each other, are adapted to connect the windings 39 and 40, through a resistor 43, across the armature 11 of the exciting generator 10. The contact member 41 of the relay 39, when operated, is adapted to establish a short circuit around the resistor 14 which is included in the circuit of the field winding 12. The contact member 42 of the relay 40, when operated, is adapted to short circuit a portion of the resistor 35 that is included in the circuit of the winding 34 of the relay 28.

Assuming the apparatus of the system to be in the position illustrated in Fig. 4 of the drawing and the voltage of the supply circuit 1 to be suddenly reduced, the energization of the electromagnet 28 is accordingly reduced to permit the levers 24, 19 and 18 to effect operation of the contact members 16 and 17. The contact members 16 and 17 effect operation of the relays 37 and 38. The relay 37 short circuits the resistor 14 to increase the voltage of the exciting generator 10 and, accordingly, to increase the excitation of the synchronous condenser 7 to correct the voltage conditions in the supply circuit. The relay 38 short circuits a portion of the resistor 39 to increase the excitation of the electromagnet 28 and, accordingly, to produce a vibratory action of the levers 24, 19 and 18 in the customary manner of regulators having vibrating contact members.

In case the voltage of the supply circuit 1 is suddenly raised above a predetermined value, the electromagnet 28 is quickly operated and the movement thereof is transmitted to the contact members 16 and 17 by means of the levers 24, 19 and 18. In the case under consideration, however, the contact members 16 and 17 are separated to decrease the excitation of the synchronous condenser 7. In regulators provided with vibrating contact members, the lever system is normally in continuous vibration and a decrease or an increase in the line voltage merely results in an increase or a decrease in the length of time the main-contact members remain in engagement with each other.

The contact members 16 and 17 are not only controlled by the electromagnet 28 in accordance with the voltage conditions in the supply circuit 1, but also by the electromagnet 23 in accordance with the current conditions obtaining in the supply circuit. The electromagnet 23 is very sluggish in its action in order to permit the induction regulators 6, which are connected to the various feeder circuits, to effect complete regulation of the voltage before it operates in order to correct the current conditions obtaining in the supply circuit 1. The contact member 17, being mounted upon the lever 18, is directly operated by the electromagnet 23.

It should be understood that the regulator disclosed in this application is not adapted to effect a permanent correction of the voltage in the supply circuit but merely to correct for instantaneous voltage changes. Any prolonged voltage changes must be taken care of by means of the regulators which are associated with the various feeder circuits.

Modifications in the system and arrangement and location of parts may be made within the spirit and scope of my invention, and such modifications are intended to be covered by the appended claims.

I claim as my invention:

1. In a regulator system for a supply circuit, a synchronous condenser, means quickly responsive to changes of voltage in the supply circuit for governing the excitation of the condenser, and means slowly responsive to changes in the condenser current for governing the excitation of the synchronous condenser.

2. In a regulator system for a supply circuit, a dynamo-electric machine connected to the supply circuit, means for exciting said machine, means quickly responsive to changes in the supply circuit for governing said exciting means, and means slowly responsive to changes in the machine circuit for governing said exciting means.

3. In a regulator system for an alternating-current supply circuit, a synchronous condenser, and means for varying the excitation of the synchronous condenser in accordance with the current supplied thereto and in accordance with the supply-circuit voltage.

4. In a regulator system for an alternating-current supply circuit, the combination with a synchronous condenser connected to the supply circuit, and means for exciting said synchronous condenser, of means quickly responsive to changes in the supply-circuit voltage for governing the exciting means, and means slowly responsive to changes in the value of the current supplied to the condenser for governing the operation of the exciting means.

5. In a regulator for a supply circuit, a synchronous condenser connected to the supply circuit, a pair of contact members, an electromagnet slowly responsive to changes in the condenser circuit for controlling said contact members, and an electromagnet quickly responsive to changes in voltage in the supply circuit for controlling said contact members 6. In a regulator for a supply circuit, a pair of co-operating contact members, and two electromagnets for effecting movement of said contact members in accordance with the voltage and the current changes, means for relatively lightly damping one of said electromagnets, and means for relatively heavily damping the other of said electromagnets.

7. In a regulator, a pivotally mounted bell-crank lever having a second lever and a third lever pivotally mounted thereon, two co-operating contact members, one of which is mounted on the second lever, an electromagnet connected to, and adapted to effect operation of, the second lever, a dashpot and a second electromagnet respectively connected to the third lever on opposite sides of the pivotal point thereof in a manner to transmit only rapid vibrations of the second electromagnet to the contact member mounted on the second lever.

8. In a regulator, a pivotally mounted bell-crank lever having a second lever and a third lever pivotally mounted thereon, two co-operating contact members, one of which is mounted on said second lever, an electromagnet for effecting movement of the second contact lever to operate the contact members, a second electromagnet connected to the third lever and adapted to transmit only rapid vibrations thereof to the contact members.

9. In a regulator for a supply circuit, two co-operating contact members, a lever system for movably supporting one of said contact members, two electromagnets respectively operated in accordance with voltage and current conditions for operating the lever system to control the contact members, and means for connecting one of said magnets to the lever system in a manner to transmit only rapid movements thereof to the movable contact member.

10. In a regulator for a supply circuit, two co-operating contact members, a lever for supporting one of said contact members, an electromagnet slowly responsive to current changes for effecting movement of said lever, a second pivotally mounted lever adapted to form a support for the first-mentioned lever, a third lever pivotally mounted on said second lever, an electromagnet responsive to changes of voltage, and means for connecting the last mentioned electromagnet to the third lever in a manner to freely transmit to the first lever only movements that are caused by very rapid changes of voltage in the supply circuit.

11. In a regulator, a switch, control means therefor which is quickly responsive to voltage changes and control means therefor which is slowly responsive to current changes of the same power circuit.

12. In a regulator system for a supply circuit, a synchronous condenser connected thereto, and a regulator therefor comprising a pair of co-operating contact members, and two electromagnets for effecting movement of said contact members in accordance with the voltage and the current changes, one of said electromagnets being connected to one of said contact members in a manner to transmit only rapid vibrations of the electromagnet to the contact members.

13. In a regulator system for a supply circuit, a dynamo-electric machine connected thereto, and a regulator therefor comprising a pair of co-operating contact members, and two electromagnets for effecting movement of said contact members in accordance with the voltage and the current changes of said circuit, one of said electromagnets being connected to one of said contact members in a manner to transmit only rapid vibrations of the electromagnet to the contact members.

14. In a regulator system for a supply circuit, a dynamo-electric machine connected thereto and a regulator therefor comprising two co-operative contact members, a lever system for movably supporting one of said contact members, two electromagnets respectively operated in accordance with the voltage and current conditions for actuating the lever system to control the contact members, and means for connecting one of said magnets to the lever system in a manner to transmit only rapid vibrations thereof to the movable contact member.

15. In a regulator system for a supply circuit, a dynamo-electric machine connected thereto, and a regulator therefor comprising a pivotally mounted bell-crank lever having a second lever and a third lever pivotally mounted thereon, two co-operating contact members, one of which is mounted on the second lever, an electromagnet connected to, and adapted to effect operation of, the second lever, a dash pot and a second electromagnet respectively connected to the third lever on opposite sides of the pivotal point thereof in a manner to transmit only rapid vibrations of the second electromagnet to the contact member mounted on the second lever.

16. A regulator system for a dynamo-electric machine which comprises two co-operating contact members, and two electromagnets for effecting movement of one of said contact members, one of said electromagnets being connected to the movable contact member in a manner to transmit only rapid vibrations that are effected by the electromagnet.

In testimony whereof, I have hereunto subscribed my name this 31st day of July, 1918.

CLARENCE A. BODDIE.